US008813522B2

(12) United States Patent
Li et al.

(10) Patent No.: US 8,813,522 B2
(45) Date of Patent: Aug. 26, 2014

(54) SILICON PHOTONIC FIBER AND METHOD OF MANUFACTURE

(75) Inventors: Guifang Li, Oviedo, FL (US); Fatih Yaman, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 1322 days.

(21) Appl. No.: 12/578,958

(22) Filed: Oct. 14, 2009

(65) Prior Publication Data

US 2010/0092141 A1 Apr. 15, 2010

Related U.S. Application Data

(60) Provisional application No. 61/105,129, filed on Oct. 14, 2008.

(51) Int. Cl.
*G02B 6/02* (2006.01)

(52) U.S. Cl.
USPC ............. 65/393; 385/123; 423/349; 264/1.24

(58) Field of Classification Search
USPC ............. 264/1.24; 423/349; 385/123; 65/393
See application file for complete search history.

(56) References Cited

U.S. PATENT DOCUMENTS

2008/0038170 A1* 2/2008 Sandhage et al. ............. 423/155

OTHER PUBLICATIONS

YouTube video "Chemical Reaction between Magnesium and Silica", jkennyl, Jun. 6, 2007.*

* cited by examiner

*Primary Examiner* — Queenie Dehghan
(74) *Attorney, Agent, or Firm* — Thomas | Horstemeyer, LLP

(57) ABSTRACT

Methods of converting silica to silicon and fabricating silicon photonic crystal fiber (PCF) are disclosed. Silicon photonic crystal fibers made by the fabrication methods are also disclosed. One fabrication method includes: sealing silica PCF and a quantity of magnesium within a container, the quantity of magnesium defined by $2Mg_{(g)}+SiO_{2(s)} \rightarrow 2MgO_{(s)}+Si_{(s)}$; converting silica PCF to a reacted PCF through magnesiothermic reduction; and converting the reacted PCF to the fabricated silicon PCF by selective dissolution of the reacted PCF in an acid. Another fabrication method includes: adding silica PCF and a quantity of solid magnesium to an unsealed container, the quantity of magnesium substantially in excess of that defined by $2Mg_{(g)}+SiO_{2(s)} \rightarrow 2MgO_{(s)}+Si_{(s)}$; converting silica PCF to a reacted PCF through magnesiothermic reduction; and converting the reacted PCF to the fabricated silicon PCF by selective dissolution of the reacted PCF in an acid.

9 Claims, 4 Drawing Sheets

SILICON PHOTONIC FIBER AND METHOD OF MANUFACTURE

CROSS-REFERENCE TO RELATED APPLICATION

This application claims the benefit of U.S. Provisional Application No. 61/105,129, filed Oct. 14, 2008, which is hereby incorporated by reference in its entirety.

BACKGROUND

Optical fibers have applications in many different fields including communications, spectroscopy, medicine, and materials processing. Optical fibers which can be used to generate and/or transport radiation in the mid-infrared (mid-IR) range are desirable, but conventional processes for fabricating such fibers such as drawing are not yet commercially feasible.

SUMMARY

Disclosed are methods of fabricating silicon photonic crystal fiber (PCF), and silicon photonic crystal fibers made by these methods. Also disclosed are methods of converting silica to silicon.

One such conversion method includes: adding silica and a quantity of solid magnesium to an unsealed container, the quantity of solid magnesium substantially in excess of that defined by the molar ratio of magnesium to silica in an equation $2Mg_{(g)}+SiO_{2(s)} \rightarrow 2MgO_{(s)}+Si_{(s)}$; converting the silica to a reacted product through magnesiothermic reduction; and converting the reacted product to silicon by selective dissolution of the reacted product in an acid.

One such fabrication method includes: sealing silica PCF and a quantity of solid magnesium within a container, the quantity of magnesium defined by the molar ratio of magnesium to silica in an equation $2Mg_{(g)}+SiO_{2(s)} \rightarrow 2MgO_{(s)}+Si_{(s)}$; converting silica PCF to a reacted PCF through magnesiothermic reduction; and converting the reacted PCF to the fabricated silicon PCF by selective dissolution of the reacted PCF in an acid.

Another such fabrication method includes: adding silica PCF and a quantity of solid magnesium to an unsealed container, the quantity of solid magnesium substantially in excess of that defined by the molar ratio of magnesium to silica in an equation $2Mg_{(g)}+SiO_{2(s)} \rightarrow 2MgO_{(s)}+Si_{(s)}$; converting silica PCF to a reacted PCF through magnesiothermic reduction; and converting the reacted PCF to the fabricated silicon PCF by selective dissolution of the reacted PCF in an acid.

Another such fabrication method includes: providing a first quantity of silica PCF and a second quantity of magnesium granules in an unsealed container; heating the unsealed container in a heating chamber set to 600° C.; supplying the heating chamber with argon gas; reducing the temperature of the heating chamber when substantially all of the Si in the silica PCF has been converted to $Mg_2Si$, thereby producing a reacted PCF containing MgO and $Mg_2Si$; allowing the reacted PCF to cool until the temperature of the unsealed container drops below 150° C.; annealing the reacted PCF in the heating chamber that is set to at 700° C., until substantially all of the Mg in the $Mg_2Si$ is evaporated to produce a silicon PCF containing MgO; and leaching the silicon PCF containing in a hydrochloric and ethanol mixture to remove the MgO, thereby leaving the fabricated silicon PCF. Some embodiments also include: before the heating, flushing the argon gas through the heating chamber for a predetermined period of time. Some embodiments also include: before the heating, flushing the argon gas through the heating chamber for a predetermined period of time; and reducing a flow rate of the argon gas through the heating chamber such that the ambient atmosphere in the container diffuses out.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Figure 1:
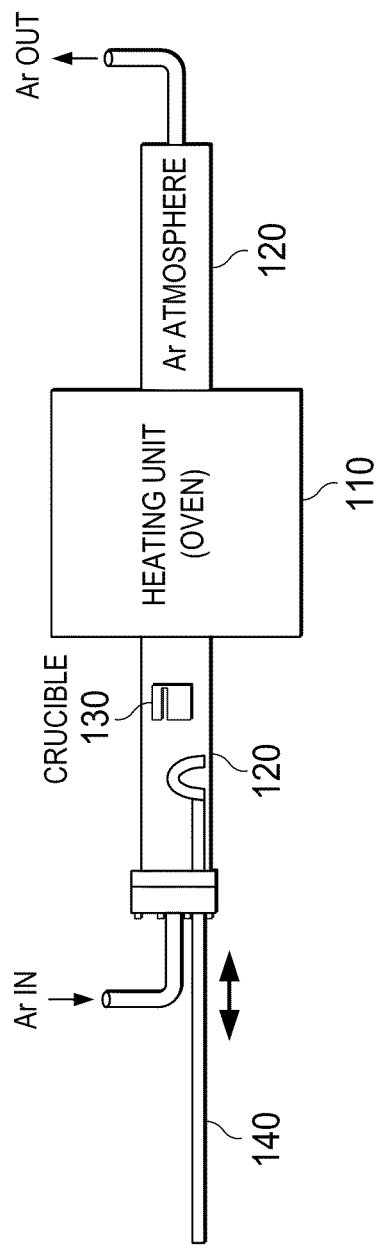
FIG. 1 is a block diagram of a system which can be used to perform the fabrication process according to some embodiments disclosed herein.

Described herein are embodiments of a fabrication method for silicon photonic crystal fibers (PCF) using conversion from silica through magnesiothermic reduction. The fabrication method preserves the nanostructure of the silica in the raw material during the conversion to silicon. In some embodiments, the hollow-core silica fiber used as a raw material has a honeycomb-shaped photonic crystal structure around a hollow core. The use of silicon in the converted fiber provides low absorption loss in the mid-IR range, an extremely high optical damage threshold, and excellent thermal conductivity. The use of nanostructured silicon (ns-Si) extends the low absorption loss into near-IR, and improves third-order non-linearity (because of quantum confinement).

Embodiments of the fabrication method for nanostructured silicon PCF disclosed herein start with silica PCF as raw material, add magnesium, and produce silicon PCF by magnesiothermic reduction. In some embodiments, the reaction uses carefully controlled quantities of ingredients and occurs in a sealed environment. In other embodiments, the reaction occurs in an unsealed environment and does not require the ingredient quantities to be carefully controlled.

The chemical reaction used to convert the silica PCF to silicon PCF is an oxidation-reduction reaction in which the silicon in silica is exchanged with a displacing reactant species (Mg), so as to convert the silica within the PCF to silicon while preserving the micro- or nano-structure of the fiber. More specifically, this reaction described by equation $$2Mg_{(g)}+SiO_{2(s)} \rightarrow 2MgO_{(s)}+Si_{(s)} \qquad (1)$$

in which 2 moles of elemental reactant Mg react with 1 mole of the oxide $SiO_2$ present within the silica PCF. In this redox reaction, 2 moles of the reactant Mg become oxidized to form 2 moles of the product oxide, MgO, and Si within the oxide, $SiO_2$, is reduced to form 1 mole of Si.

A sealed environment embodiment will now be described. Solid magnesium and silica PCF, in quantities described by the molar ratios of Eq. (1), are introduced into a container. Using quantities defined by the molar ratio avoids the production of magnesium silicide. Since the container is sealed, magnesium remains in the container, and since the amount of magnesium is closely matched to the amount of silica, the magnesium reacts until all the silica is reduced to silicon. Thus, no magnesium is available to produce magnesium silicide.

The container is made of a material which is non-reactive with respect to magnesium and silica (e.g., steel). The container is sealed, for example, by welding. In an example embodiment, the container is a steel tube which is sealed by crimping the ends of the tube and then welding the ends shut. Sealing allows a significant magnesium vapor pressure to develop within the container upon heating. The fibers and the magnesium are physically separated in some manner, for example, by crimping the tube to form two chambers.

The container is heated in an inert environment (e.g., argon gas or another inert gas) to a temperature high enough to vaporize the magnesium. In an example embodiment, the temperature is high enough to not only vaporize the magnesium, but to also generate a significant magnesium vapor pressure within the container. This vapor pressure causes the magnesium gas to migrate toward the fibers. The starting silica nanostructures in the PCF react with the magnesium gas, as described in Eq. (1), to produce co-continuous, nanocrystalline mixtures of silicon and magnesium oxide. The amount of heating time varies depending on the size and thickness of the fibers, the quantities of ingredients involved, and the temperature used, as should be appreciated by a person of ordinary skill in the art.

After this reaction occurs, the magnesium oxide product is selectively dissolved (e.g., in an acid such as HCl), leaving silicon PCF. The result of this process is that the interconnected network of silicon nanocrystals within the PCF retains the morphology of the starting silica nanostructure.

An embodiment using an unsealed environment will now be described. As with the sealed embodiment, this embodiment of the fabrication method starts with silica PCF as raw material and adds magnesium. However, a sealed container is not required, and the quantity of magnesium used is substantially in excess of (e.g., 2×) the molar ratio of Eq. (1). After a quantity of magnesium granules are mixed in a container with the silica PCF, the mixture is baked in an inert environment (e.g., argon gas or another inert gas) at a temperature between approximately 600° C. and 700° C. The container may instead be open, or loosely capped. Some embodiments use a container of a material that is non-reactive with respect to the raw materials, such as graphite.

During baking, the solid magnesium granules become a gas. Silica molecules in the PCF react with the magnesium gas and are thus reduced to silicon through the magnesiothermic reduction process described above in Eq. (1). At this temperature, excess magnesium also reacts with silicon to form magnesium silicide, as described by Eq. (2):

$$Si_{(s)} + 2Mg_{(g)} \rightarrow + 2Mg_2Si_{(s)} \qquad (2)$$

The baking continues until substantially all of the silica in the PCF has been converted to magnesium silicide. This amount of time varies depending on the size and thickness of the fibers, the quantities of ingredients involved, and the temperature used. At 600° C., observations show that approximately 1 hour at 550° C., 20 minutes at 600° C., or 10 minutes at 650° C. is enough to achieve substantially complete conversion of the silica in a 10-µm fiber.

As stated above, the reaction produces magnesium silicide. An annealing step is performed after baking to remove the magnesium. Before annealing, the heat is removed or reduced, and the reacted PCF is allowed to cool until the temperature of the reacted PCF drops below approximately 150° C. The reacted PCF is then annealed in an inert environment at a temperature high enough to vaporize the magnesium. The annealing continues until substantially all of the magnesium in the magnesium silicide is evaporated. This amount of time varies depending on the size and thickness of the fibers, the quantities of ingredients involved, and the temperature used. At 700° C., observations show that several hours is enough to achieve a substantially complete reaction. The remaining product is silicon PCF containing MgO. A mixture of hydrochloric acid and ethanol is added to remove the MgO. This leaching step leaves a PCF that contains silicon with very little impurities remaining.

Some embodiments of the silicon PCF fabrication method are practiced using the system of FIG. 1. The system 100 includes a heating chamber 110 and a tube 120. The tube 120 is filled with an inert gas such as argon, and the inert gas is allowed to flow through the heating chamber 110, thus surrounding the container 130. The inert gas is first flushed through the heating chamber 110, then the flow rate is reduced such that the ambient atmosphere in the container 130 diffuses out. The flow rates vary according to characteristics such as the size of the fibers, the amount of magnesium, the size of the container 130, etc. In some configurations, the initial flow rate is 10 liters per minute for approximately 10 minutes, then the rate is reduced to 3 liters per minute for another 50 minutes. The heating chamber 110 is then ready for the introduction of raw materials.

A quantity of silica photonic crystal fibers and magnesium granules are placed in container 130. The fibers are spaced apart from the granules so that the fibers react with the vaporized magnesium rather than the solid magnesium. This spacing may be achieved in various ways. For example, when relatively large fibers are used, the granules can be placed at the bottom of the container 130 and the fibers can be placed directly in the container 130. The fibers are long enough to rest above the granules rather than being mixed in with the granules. If the fibers are too small to extend across the container and thus keep separate from the granules, the fibers can instead be placed on a separate platform (not shown) which is sized so that it rests above the bottom of the container 130. Either mechanism allows magnesium gas to circulate around the fibers so that the fibers react with the gas rather than the solid magnesium granules.

The container 130, containing the mixture of silica PCF and solid magnesium, is introduced into the heating chamber 110, for example, using a pushrod 140 (which may be formed of quartz tubing). The container 130 is placed at a section of the heating chamber 110 that will be about 150° C. cooler than the maximum temperature. In one configuration, this section is located approximately 12 cm from the hottest part of the heating chamber 110. This placement allows the heating chamber 110 to heat up gradually without bringing the fibers up to the reaction temperature.

The heat in the chamber is then turned on and the temperature is set to the baking temperature. As discussed earlier, the baking temperature is 600° C. in some configurations. In some embodiments of the fabrication process, heating chamber 110 is allowed to heat up quickly, typically about 60° C./minute. Typically, the temperature overshoots the preset temperature, and stabilizes at 600° C. in 15 minutes or so.

When the temperature inside heating chamber 110 is stabilized, container 130 is moved to the approximate center of the chamber 110, where the temperature is expected to be at a maximum (i.e., the preset temperature applied to the heating chamber 110). Since the temperature of container 130 is only 150° C. degrees cooler than the preset temperature, this movement brings the fibers up to the reaction temperature quickly. This also allows only a small drop in the temperature at the central portion of heating chamber 110, keeping the temperature of chamber 110 fairly stable. A stable temperature allows an accurate estimation of the reaction time.

At the end of the desired reaction time, the heating chamber 110 is set to room temperature. The reaction time is the minimum time that the samples react completely. The reaction time is measured from the time the container 130 is pushed to the central portion of the chamber to the time when the chamber starts cooling (even though the temperature of the chamber does not drop immediately and the reaction continues). The reaction time depends on the baking temperature and the thickness of the fibers. For instance, typical reaction times for a 10-μm-diameter regular silica fiber are an hour at 550° C., 20 minutes at 600° C., and 10 minutes at 650° C.

With the container 130 still inside, the heating chamber 110 is left to cool until the container 130 drops below 150 C. Once the fibers have reacted completely, the cooling rate does not affect the conversion. Therefore, in some embodiments the cooling rate is not controlled and the heating is allowed to cool as fast as possible. Typically, this takes about two hours. After the container 130 cools below 150° C., the container 130 is removed from the oven.

As described above, using an excess amount of magnesium (more than is needed for the reaction of Eq. 1) converts almost all of the silicon to magnesium silicide. Thus, at this point the baked samples contain magnesium oxide and magnesium silicide. Because the amount of magnesium is not precisely controlled and the reactants are not confined, almost all the silicon freed from oxygen reacts with magnesium to form magnesium silicide. The magnesium is now removed from the magnesium silicide by annealing the fibers in an empty container 130. In some embodiments of the fabrication method, the baked samples are annealed in an empty container 130 at 700° C. for 1 to 6 hours, depending on sample size.

Because of its high vapor pressure, magnesium simply evaporates during the annealing and leaves silicon behind, preserving the shape of the fibers. Thus, the fibers after annealing contain magnesium oxide and silicon, with no visible structural change. Annealing is followed by selective magnesia dissolution in dilute HCl:EtOH solution. Dissolution removes the magnesium oxide, along with any magnesium silicide that remains after annealing, leaving silicon.

The converted fibers fabricated by this process are thus silicon in a pure form, substantially free of impurities. The annealing preserves the shape of both solid core fibers and hollow core fibers. The annealing method is appropriate for both large and small diameter fibers.

Figure 2:
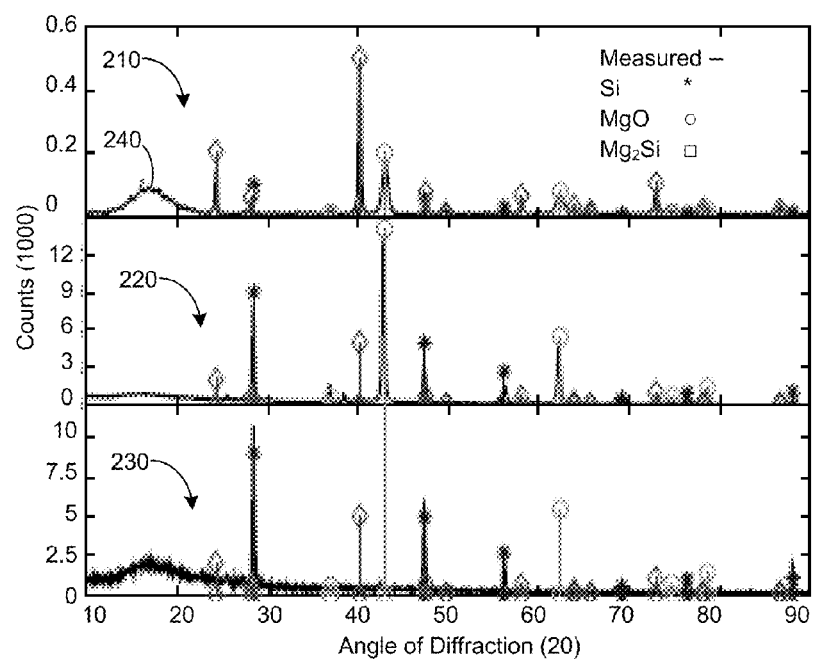
FIG. 2 shows results of an xray powder diffraction test performed on silicon photonic crystal fibers fabricated according to some embodiments disclosed herein.

X-ray powder diffraction (XRD) can be used to verify the chemical composition of the samples. Since the silicon photonic crystal fiber samples are too small to produce counts that are high enough for use with XRD, large amounts of standard single-mode fiber (50×1-cm long) are converted to silicon and used for the measurements. FIG. 2 illustrates observed results of the XRD. The three curves 210, 220, and 230 show results after baking, after annealing and after leaching, respectively. diffraction peaks for Si, MgO and Mg$_2$Si are shown by *, o, and □, respectively. The expected diffraction peaks for Si, MgO and Mg$_2$Si are identified using a commercial software and included in the figures. Curve 210 shows that the sample has only MgO and Mg2Si and almost no Si. Curve 220 shows that after annealing, Mg$_2$Si disappears almost completely and Si appears showing that Mg evaporates during annealing and leaves Si behind. Curve 230 shows that after leaching, all the MgO and Mg$_2$Si is removed leaving only Si. The amorphous hump (240) at 18° is caused by the sample holder tape. The narrowness of the diffraction peaks shows that Si is mostly crystalline.

Figure 3A:
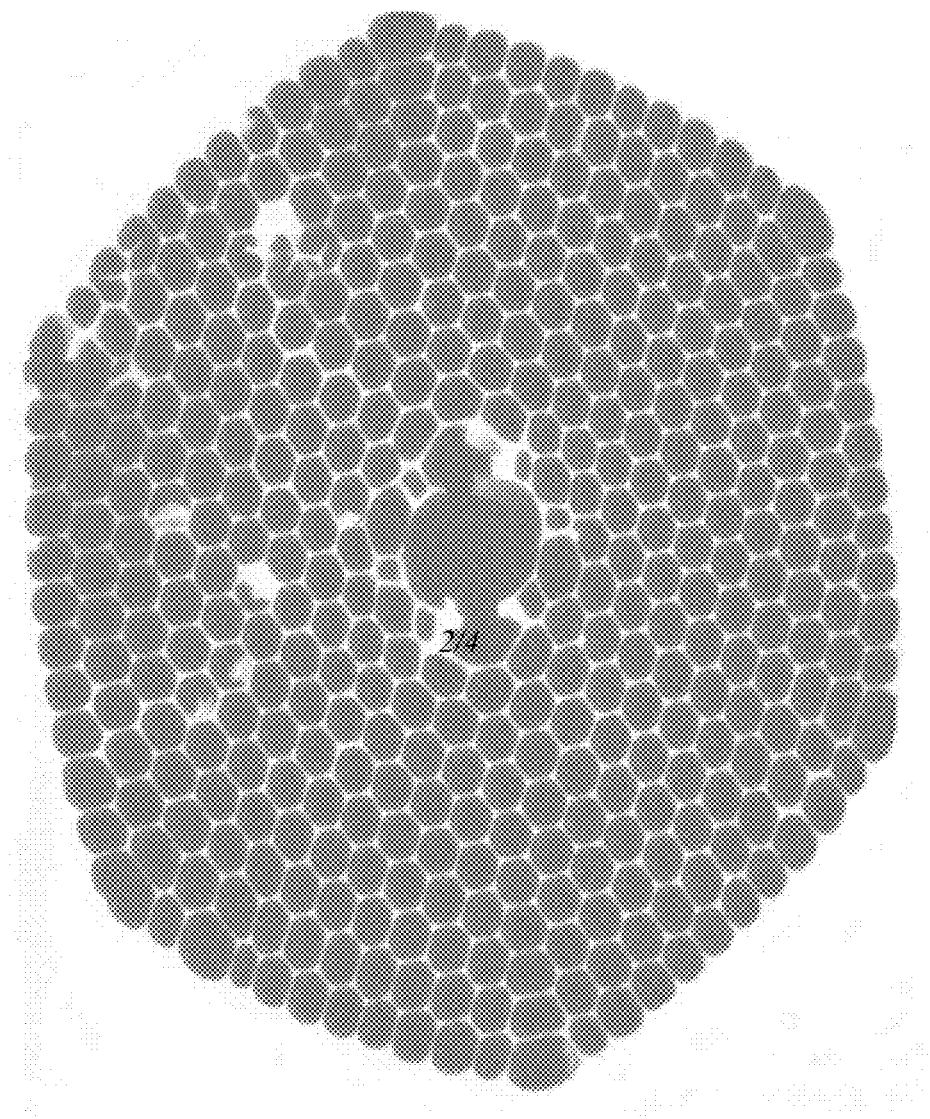
FIGS. 3A and 3B show the scanning electron microscope images of the silica PCF before conversion and the SiPCF after conversion, respectively.
Figure 3B:
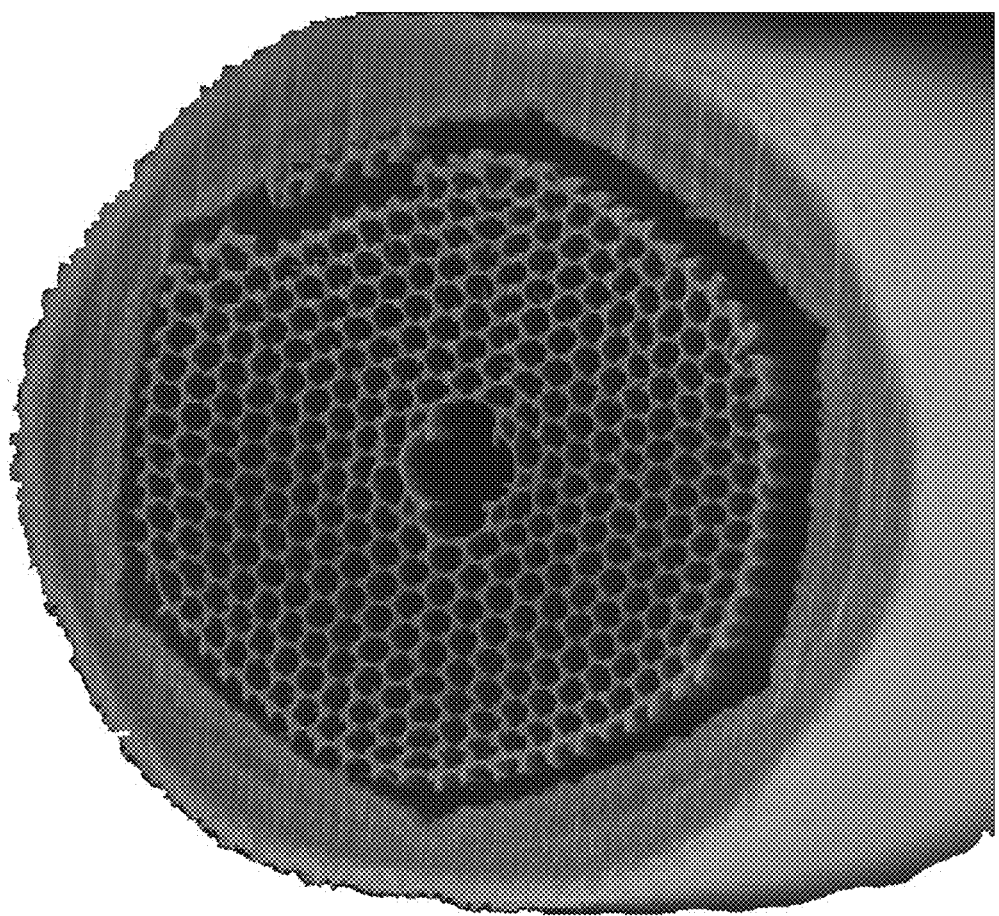

FIGS. 3A and 3B show the scanning electron microscope images of the silica PCF before conversion and the SiPCF after conversion, respectively. Even though the holey section is detached from the solid cladding, the photonic crystal structure is well preserved especially around the hollow core. To verify that the holey structure of the silicon fiber remained intact along the fiber, waveguiding in a 1-mm-long sample at 1550 nm is realized. For waveguiding the sample is filled with photoresist SU-8 so that the sample can be fixated on a GaAs wafer which makes it possible to cleave the samples easily. FIG. 4 shows the end facet of the fiber when the light is coupled to the fiber core. Because the fiber is very short, waveguiding is verified by the fact that moving the coupling lens at the front facet in and out only changed the coupling efficiency and not the shape or size of the output light imaged on the charge coupled device (CCD) camera. Only the center of the fiber facet has a bright spot and rest of the holey structure remains dark.

Nanostructured silicon photonic crystal fiber fabricated using the methods disclosed herein has both linear and non-linear optical applications, such as: tunable mid-infrared (IR) generation and detection; mid-IR transport in fiber mid-IR for power delivery; Raman scattering/amplification; and Brillouin scattering/amplification. Also, all linear and nonlinear optical application in the near-IR using silica PCF can be realized in the mid-IR with the availibility of silicon PCF.

Fields of use for nanostructured silicon PCF fabricated according to the methods disclosed herein include: detection/Identification using linear and non-linear spectroscopy; communications, including coherent and entangled state generation; laser surgery; sensors for disease diagnostics and treatment; markers for human metabolic activity; sensors for remote sensing of clean air, safeguarding public spaces, and climate models; remote sensing command, control, and communications ($C^3$); defense countermeasures; spectrally agile, narrow-line light detection and ranging (LiDAR) and laser detection and ranging (LADAR); secure communications; and sensing of chemical and biological weapons.

The foregoing disclosure has been presented for purposes of illustration and description. The disclosure is not intended to be exhaustive or to limit the disclosure to the precise forms disclosed. Various modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variations are within the scope of the disclosure as determined by the appended claims when interpreted in accordance with the breadth to which they are fairly and legally entitled.

The invention claimed is:

1. A method of fabricating silicon photonic crystal fiber (PCF), the method comprising:
   sealing silica PCF and a quantity of solid magnesium within a container, the quantity of magnesium defined by the molar ratio of magnesium to silica in an equation $2Mg_{(g)} + SiO_{2(s)} \rightarrow 2MgO_{(s)} + Si_{(s)}$;
   converting silica PCF to a reacted PCF through magnesiothermic reduction; and
   converting the reacted PCF to the fabricated silicon PCF by selective dissolution of the reacted PCF in an acid.

2. The method of claim 1, wherein the acid is HCl.

3. The method of claim 1, wherein the solid magnesium comprises magnesium granules that are mixed with the silica PCF and further comprising at least partially surrounding the mixture of silica PCF and magnesium granules with an inert gas.

4. The method of claim 1, further comprising:
allowing the reacted PCF to cool until its temperature drops below 150° C.

5. A method of fabricating silicon photonic crystal fiber (PCF), the method comprising:
adding silica PCF and a quantity of solid magnesium to an unsealed container, the quantity of solid magnesium substantially in excess of that defined by the molar ratio of magnesium to silica in an equation $2Mg_{(g)}+SiO_{2(s)} \rightarrow 2MgO_{(s)}+Si_{(s)}$;
converting silica PCF to a reacted PCF through magnesiothermic reduction; and
converting the reacted PCF to the fabricated silicon PCF by selective dissolution of the reacted PCF in an acid.

6. The method of claim 5, the converting the reacted PCF comprising:
leaching the silicon PCF with a mixture of hydrochloric acid and ethanol.

7. The method of claim 5, the converting silica PCF comprising:
heating the unsealed container at a temperature between approximately 600° C. and 700° C. until substantially all of the Si in the silica PCF has been converted to $Mg_2Si$, to produce a first reacted PCF containing MgO and $Mg_2Si$;
allowing the first reacted PCF to cool until the temperature of the unsealed container drops below 150° C.; and
annealing the first reacted PCF at approximately 700° C. until substantially all of the Mg in the $Mg_2Si$ is evaporated to produce a second reacted PCF that contains MgO.

8. The method of claim 7, the converting the reacted PCF comprising:
leaching the second reacted PCF with a mixture of hydrochloric acid and ethanol to remove MgO, thereby leaving the fabricated silicon PCF.

9. The method of claim 5, wherein the solid magnesium comprises magnesium granules that are mixed with the silica PCF and further comprising providing a flow of inert gas which at least partially surrounds the mixture of silica PCF and magnesium granules with an inert gas.

* * * * *